United States Patent
Jeong et al.

(10) Patent No.: US 12,234,169 B2
(45) Date of Patent: Feb. 25, 2025

(54) CENTRIFUGAL DEHYDRATOR AND CENTRIFUGAL DEHYDRATION METHOD

(71) Applicant: LG CHEM, LTD, Seoul (KR)

(72) Inventors: Sung Woo Jeong, Daejeon (KR); In Yong Jeong, Daejeon (KR); Sang Ho Lee, Daejeon (KR); Eun Jung Joo, Daejeon (KR); Dae Young Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 682 days.

(21) Appl. No.: 17/420,339

(22) PCT Filed: Jun. 9, 2020

(86) PCT No.: PCT/KR2020/007457
§ 371 (c)(1),
(2) Date: Jul. 1, 2021

(87) PCT Pub. No.: WO2021/096016
PCT Pub. Date: May 20, 2021

(65) Prior Publication Data
US 2022/0089469 A1    Mar. 24, 2022

(30) Foreign Application Priority Data
Nov. 11, 2019 (KR) .......... 10-2019-0143830

(51) Int. Cl.
*C02F 11/127* (2019.01)
*B01D 53/26* (2006.01)

(52) U.S. Cl.
CPC ............ *C02F 11/127* (2013.01); *B01D 53/26* (2013.01)

(58) Field of Classification Search
None
See application file for complete search history.

(56) References Cited

U.S. PATENT DOCUMENTS 3,864,256 A * 2/1975 Hultsch .................. B01D 33/11
494/39
4,997,575 A 3/1991 Hultsch
(Continued)

FOREIGN PATENT DOCUMENTS

CN    103977915 A    8/2014
CN    207294565 U    5/2018
(Continued)

OTHER PUBLICATIONS

"Experimental Research Methods", edited by Jiongtian Liu et al., China University of Mining and Technology Press, Jan. 2016, 3rd edition, 1st printing, pp. 321-323.
(Continued)

*Primary Examiner* — Krishnan S Menon
(74) *Attorney, Agent, or Firm* — Bryan Cave Leighton Paisner LLP

(57) ABSTRACT

A centrifugal dehydrator according to an embodiment of the present disclosure for solving the above problems includes: a slurry flow tube through which slurry, in which polymers and water are mixed, flows; a gas flow tube through which a gas flows; a mixture flow tube which is connected from the slurry flow tube and the gas flow tube and through which a mixture of the slurry and the gas flows; a basket into which the mixture is injected from the mixture flow tube and which rotates to apply centrifugal force to the slurry in the mixture; a driving part that allows the basket to rotate; and a porous plate disposed on a peripheral portion of the basket to discharge the water from the slurry to the outside of the basket.

5 Claims, 2 Drawing Sheets

(56) References Cited

U.S. PATENT DOCUMENTS

| | | |
|---|---|---|
| 2014/0027389 A1 | 1/2014 | Lange |
| 2017/0349470 A1 | 12/2017 | Crampon et al. |
| 2018/0354835 A1 | 12/2018 | Lewis |

FOREIGN PATENT DOCUMENTS

| | | |
|---|---|---|
| JP | 05-228302 A | 9/1993 |
| JP | 11-276110 A | 10/1999 |
| JP | 2003-062600 A | 3/2003 |
| JP | 2010-142807 A | 7/2010 |
| JP | 2011-56341 A | 3/2011 |
| JP | 2013-13848 A | 1/2013 |
| KR | 10-2002-0020800 A | 3/2002 |
| KR | 10-2006-0056840 A | 5/2006 |
| KR | 10-2008-0028872 A | 4/2008 |
| KR | 10-2009-0030169 A | 3/2009 |
| KR | 10-1468519 B1 | 12/2014 |
| KR | 10-1738388 B1 | 5/2017 |
| KR | 10-2018-0009145 A | 1/2018 |

OTHER PUBLICATIONS

"Chemical Production and Safety Technology", written by Jimin Wu, et al., published by China University of Mining and Technology Press, Aug. 2014, pp. 74-76.

* cited by examiner

CENTRIFUGAL DEHYDRATOR AND CENTRIFUGAL DEHYDRATION METHOD

CROSS-REFERENCE TO RELATED APPLICATION

The present application is a National Phase entry pursuant to 35 U.S.C. § 371 of International Application No. PCT/KR2020/007457, filed on Jun. 9, 2020, and claims the benefit of and priority to Korean Patent Application No. 10-2019-0143830, filed on Nov. 11, 2019, all of which are hereby incorporated by reference in their entirety for all purposes as if fully set forth herein.

TECHNICAL FIELD

The present invention relates to a centrifugal dehydrator and a centrifugal dehydration method, and more particularly, to a centrifugal dehydrator having improved dehydration efficiency and a centrifugal dehydration method.

BACKGROUND ART

In general, sewage, manure, industrial wastewater, livestock wastewater, etc., which are discharged from homes or factories, are transferred to a sewage treatment plant for a sewage treatment process. The sewage treatment process includes a water purification process and a sludge treatment process. In the water purification process, the sewage is purified to exhibit a self-cleaning action of the river and then is discharged into public waters such as rivers. In the sludge treatment process, sludge generated in the water purification process is treated through processes such as concentration and dehydration.

A dehydrator that is one of devices used in the sludge treatment process is configured to separate filtrate from the sludge and is classified into a belt press, a filter press, a screw press, a centrifugal dehydrator, an electro-osmotic dehydrator, and the like according to its operating principle. Here, the centrifugal dehydrator is a device that injects the sludge into the rotating basket to separate filtrate from the sludge by using mechanical centrifugal force.

After such the dehydration process, a drying process is performed, and thus, a moisture content of the sludge is finally less than 1%. However, since the centrifugal dehydrator according to the related art performs the dehydration by only using centrifugal force, dehydration efficiency is not excellent, and thus a lot of energy is consumed during the drying process. Also, when many pores are generated in the sludge particles, there is a problem that moisture contained in the pores increases to deteriorate the dehydration efficiency.

DISCLOSURE OF THE INVENTION

Technical Problem

An object of the present invention for solving the above problem is to provide a centrifugal dehydrator having improved dehydration efficiency and a centrifugal dehydration method.

The objects of the present invention are not limited to the aforementioned object, but other objects not described herein will be clearly understood by those skilled in the art from descriptions below.

Technical Solution

A centrifugal dehydrator according to an embodiment of the present invention for solving the above problems includes: a slurry flow tube through which slurry, in which polymers and water are mixed, flows; a gas flow tube through which a gas flows; a mixture flow tube which is connected from the slurry flow tube and the gas flow tube and through which a mixture of the slurry and the gas flows; a basket into which the mixture is injected from the mixture flow tube and which rotates to apply centrifugal force to the slurry in the mixture; a driving part that allows the basket to rotate; and a porous plate disposed on a peripheral portion of the basket to discharge the water from the slurry to the outside of the basket.

Also, the gas can include an inert gas.

Also, the gas can include a dry air.

Also, the gas can be discharged to the outside of the basket through the porous plate.

Also, the gas can flow to a feedback tube to flow again to the gas flow tube.

Also, the gas can pass through a dehumidifier before flowing again to the gas flow tube.

Also, the gas can flow at a flow rate of 5 L/min to 20 L/min.

A centrifugal dehydration method according to an embodiment of the present invention for solving the above problems includes: a step of introducing slurry, in which polymers and water are mixed, into a slurry flow tube and introducing a gas into a gas flow tube; a step of mixing the slurry with the gas to form a mixture; a step of allowing the mixture to flow into a basket through a mixture flow tube; a step of injecting the mixture into the basket; a step of allowing the basket to rotate so as to apply centrifugal force to the slurry of the injected mixture; and a step of discharging the water to the outside from the slurry through a porous plate disposed on a peripheral portion of the basket.

Also, in the step of introducing the gas into the gas flow tube, the gas can include an inert gas.

Also, in the step of introducing the gas into the gas flow tube, the gas can include a dry air.

Also, the centrifugal dehydration method can further include, before the step of injecting the mixture into the basket, a step of allowing the basket to rotate.

Also, in the step of discharging the water to the outside, the gas can be also discharged together with the water to the outside of the basket through the porous plate.

Also, the centrifugal dehydration method can further include, after the step of discharging the water to the outside, a step of dehumidifying the gas.

Also, the centrifugal dehydration method can further include, after the step of dehumidifying the gas, a step of introducing the gas again to the gas flow tube.

Particularities of other embodiments are included in the detailed description and drawings.

Advantageous Effects

The embodiments of the present invention can have at least the following effects.

Since the slurry and the gas are mixed with each other and introduced together, the dehydration efficiency can be improved by using not only the centrifugal force but also the pressure of the gas.

The effects of the prevent invention are not limited by the aforementioned description, and thus, more varied effects are involved in this specification.

MODE FOR CARRYING OUT THE INVENTION

Figure 1:
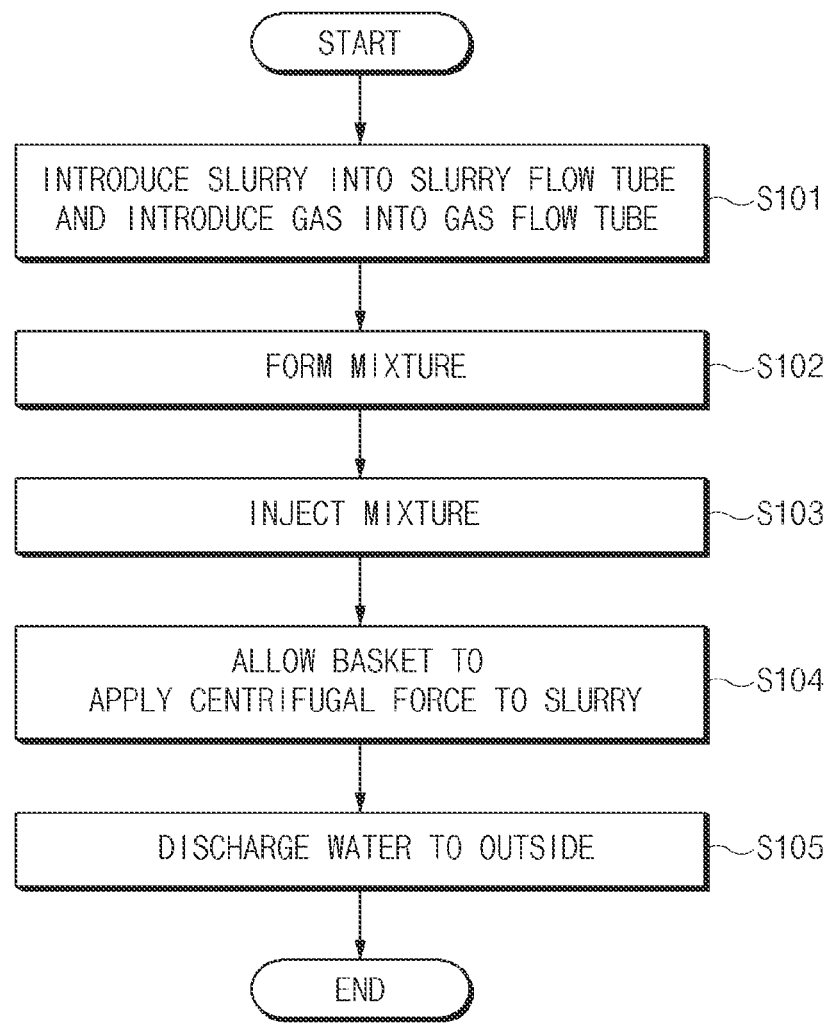
FIG. 1 is a flowchart illustrating a centrifugal dehydration method according to an embodiment of the present invention.

Advantages and features of the present invention, and implementation methods thereof will be clarified through following embodiments described with reference to the accompanying drawings. The present invention can, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is a flowchart illustrating a centrifugal dehydration method according to an embodiment of the present invention.

According to an embodiment of the present invention, since slurry and a gas are mixed with each other and introduced together, dehydration efficiency can be improved by using not only centrifugal force but also a pressure of a gas.

For this, a centrifugal dehydration method includes: a step of introducing slurry, in which polymers and water 21 are mixed, into a slurry flow tube 111 and introducing a gas into a gas flow tube 112; a step of mixing the slurry with the gas to form a mixture; a step of allowing the mixture to flow into a basket 12 through a mixture flow tube 113; a step of injecting the mixture into the basket 12; a step of allowing the basket 12 to rotate so as to apply centrifugal force to the slurry in the injected mixture; and a step of discharging the water 21 from the slurry to the outside through a porous plate 122 disposed on a peripheral portion of the basket 12.

Hereinafter, each step illustrated in the flowchart of FIG. 1 will be described in detail with reference to FIG. 2.

Figure 2:
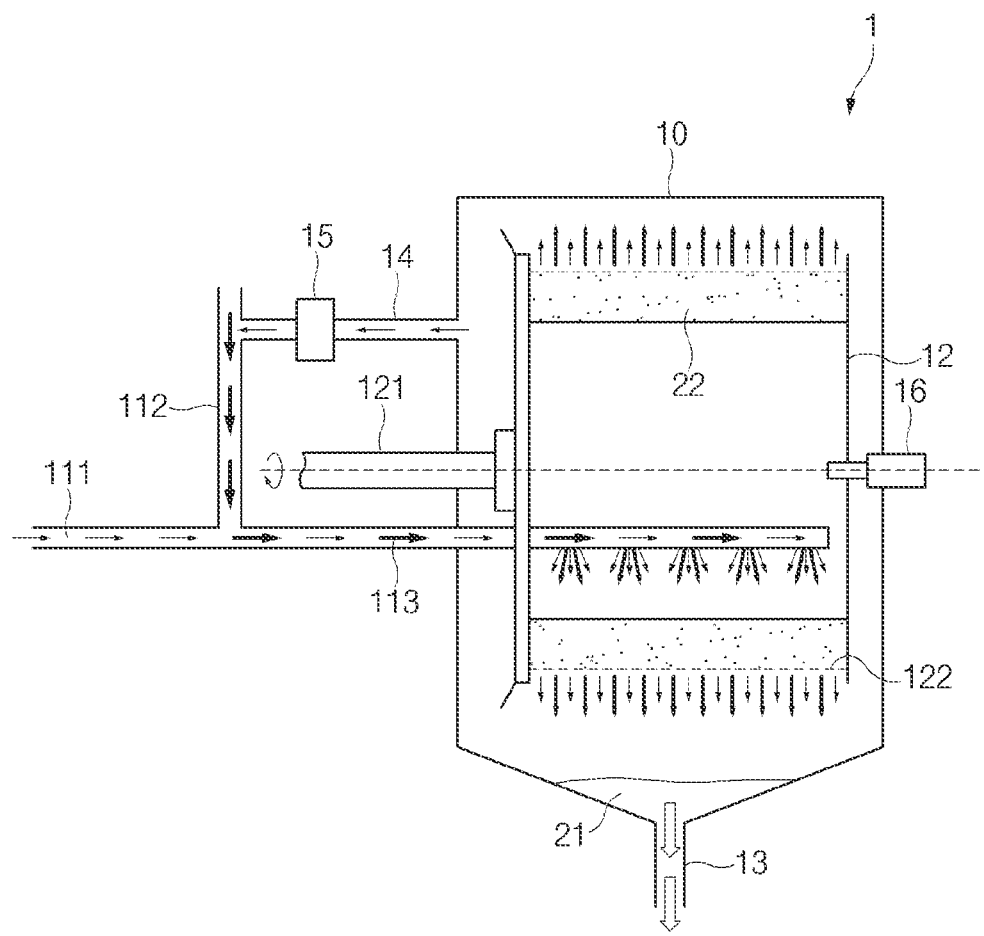
FIG. 2 is a schematic view of a centrifugal dehydrator according to an embodiment of the present invention.

FIG. 2 is a schematic view of a centrifugal dehydrator 1 according to an embodiment of the present invention.

The centrifugal dehydrator 1 according to an embodiment of the present invention includes: a slurry flow tube 111 through which slurry, in which polymers and water 21 are mixed, flows; a gas flow tube 112 through which a gas flows; a mixture flow tube 113 which is connected from the slurry flow tube 111 and the gas flow tube 112 and through which a mixture of the slurry and the gas flows; a basket 12 into which the mixture is injected from the mixture flow tube 113 and which rotates to apply centrifugal force to the slurry in the mixture; a driving part 121 that allows the basket 12 to rotate; and a porous plate 122 disposed on a peripheral portion of the basket 12 to discharge the water 21 from the slurry to the outside of the basket 12.

The slurry refers to a liquid material in which the polymers and the water 21 are mixed. If it is a sewage treatment process, such the slurry can be sludge generated during a water purification process.

The slurry flows first into the slurry flow tube 111, and the gas flows into the gas flow tube 112 that is separately provided (S101). In this case, the gas can be air in the atmosphere, but can be an inert gas such as nitrogen, helium, or an argon gas, which has low reactivity. As a result, it is possible to prevent explosion or fire due to contact with oxygen. Alternatively, since the gas has to be used for dehydration of the slurry, the gas can be dry air. Here, the dry air is air having a humidity of 10% to 20% because the air contains almost no vapor.

When the gas flows into the gas flow tube 112, if a flow rate of the gas is excessively small, an effect of dehydration will be very small later. On the other hand, if the flow rate of the gas is excessively large, a pressure in the gas flow tube 112 excessively increases, and a ratio of the gas in the mixture flow tube 113 increases later to interrupt the flow of the slurry. Also, if each of the components for solving the above problems increases generally in size, efficiency to volume decreases. The flow rate can vary depending on a diameter of the gas flow tube 112, a diameter of the mixture flow tube 113, a volume of the basket 12, and the like. However, in the centrifugal dehydrator 1 having a size that is generally used, the gas can flow at a flow rate of 5 L/min to 20 L/min through the gas flow tube 112.

The slurry flow tube 111 and the gas flow tube 112 are connected in the meantime to form the mixture flow tube 113. Then, the slurry flowing through the slurry flow tube 111 and the gas flowing through the gas flow tube 112 are mixed with each other to form a mixture, and the mixture flows through the mixture flow tube 113 (S102).

The mixture flow tube 113 is connected from the slurry flow tube 111 and the gas flow tube 112 to extends up to the inside of the basket 12. The basket 12 is provided with an empty space therein, and the peripheral portion surrounds the empty space. Also, an injection hole (not shown) can be formed to be punched around a portion of the mixture flow tube 113, which extends up to the inside of the basket 12. Thus, when the mixture flows into the inside of the basket 12 through the mixture flow tube 113, the mixture is injected into the empty space inside the basket 12 through the injection hole (S103).

The porous plate 122 is disposed on the peripheral portion of the basket 12. Here, the peripheral portion can include an outer edge of the basket 12. As described above, the mixture is formed by mixing the slurry and the gas. Thus, when the mixture is injected, a pressure of the gas is transmitted to the slurry as force. Then, a significant amount of water 21 contained in the slurry can be separated by the transmitted force, and thus, the dehydration may proceed firstly. Also, the injected slurry is attached to the porous plate 122 to form a cake 22. When the mixture is injected, the water 21 can be separated while the slurry moves to the porous plate 122 by directly receiving the force from the gas, but the slurry can be separated by an impact at the moment at which the slurry is attached to the porous plate 122.

It is preferable that the injection holes are uniformly distributed in the extending portion of the mixture flow tube 113. As a result, the slurry can be uniformly attached to the porous plate 122, and thus, the cake 22 can be uniformly formed. However, the injection holes are formed to be uniformly distributed only toward one direction and may not be formed toward other directions. An intensity at which the mixture is injected is affected by the number of injection holes. For example, as the number of injection holes increases, a flow pressure of the mixture may be dispersed, and thus, the intensity at which the mixture is injected may decrease. However, if the mixture is injected excessively weakly, the cake 22 may not be uniformly formed.

Thus, in order to uniformly form the cake 22 without excessively increasing in total number of injection holes, it is preferable that the mixture is injected only toward the one direction while the basket 12 rotates at a constant speed.

The basket 12 rotates to apply the centrifugal force to the mixture (S104). The basket 12 can have a cylindrical shape, and in this case, the porous plate 122 can be disposed at both ends of the basket 12. However, the present invention is not limited thereto. For example, the basket 12 can have various shapes if the centrifugal force is capable of being easily applied to the mixture.

In order to allow the basket 12 to rotate, the driving part 121 can be formed at one side of the basket 12. The driving part 121 includes a power motor and a power transmission part. Also, when power is generated from a power generator such as an electric motor or an engine, a power transmission part such as a shaft transmits the power to the basket 12. When the basket 12 rotates by the power, the centrifugal force can be applied to the slurry attached to the porous plate 122, and the water 21 contained in the slurry can be discharged to the outside of the basket 12 through the porous plate 122 to secondarily perform the dehydration.

It is preferable that the basket 12 already rotates before the mixture is injected into the basket 12. As a result, after the mixture is injected to perform the dehydration firstly, the dehydration can be performed secondarily by immediately applying the centrifugal force to the slurry. Also, even if the mixture is injected only toward the one direction, the cake 22 can be uniformly formed. However, the present invention is not limited thereto. For example, the rotation of the basket 12 can start after the mixture is injected into the basket 12. That is, if the centrifugal force is capable of being applied to the slurry, the rotation of the basket 12 can start at various time points.

The water 21 separated from the slurry is discharged to the outside of the basket 12 through the porous plate 122. Then, after condensed on an inner wall of the housing 10 surrounding the basket 12, the water 21 may move downward by gravity. Then, the water 21 can be discharged to the outside of the housing 10 through the discharge tube 13 connected to a lower portion of the housing 10.

After the force due to the gas is transmitted to the slurry, the gas is discharged together with the water to the outside of the basket 12 through the porous plate 122. The gas may move upward and be discharged to the outside of the housing 10 through a feedback tube 14 connected to an upper portion of the housing 10. Here, when the cake 22 is formed on the porous plate 122, the gas passes through the cake 22 while being discharged to the outside of the basket 12. As a result, the gas allows the water remaining in the cake 22 to be additionally discharged to the outside of the basket 12. Therefore, the dehydration can be performed thirdly.

The basket 12 can further include a pressure gauge 16. The pressure gauge 16 measures an internal pressure of the basket 12. Thus, a flow rate of the gas passing through the cake 22 can be grasped. Also, if the pressure is excessively high, the flow rate of the gas decreases, and if the pressure is excessively low, the flow rate of the gas increases. As a result, the inside of the basket 12 can be always maintained at an appropriate pressure.

As described above, according to an embodiment of the present invention, while the mixture is injected, the dehydration is firstly performed by the pressure of the gas, and then, the basket 12 rotates while the slurry is attached to the porous plate 122 to secondarily perform the dehydration by the centrifugal force. Also, when the slurry is attached to the porous plate 122 to form the cake 22, the dehydration can be performed thirdly when the gas passes through the cake 22. Therefore, the dehydration efficiency can be further improved than that in the case in which the dehydration is performed simply using only the centrifugal force.

According to another embodiment of the present invention, the feedback tube 14 can be connected to the gas flow tube 112 so that the exhausted gas is reused. As described above, since the gas has low reactivity, a separate reaction does not occur during the above process, and thus, the gas can be reused several times. However, while the gas is mixed with the slurry to form the mixture, the gas can contain some moisture. Therefore, it is preferable that the gas is dehumidified by passing through the dehumidifier 15 first before flowing back into the gas flow tube 112.

Furthermore, as illustrated in FIG. 2, the pressure gauge 16 can be disposed on the rotation axis of the driving part 121 of the basket 12, particularly on the rotation axis of the power transmission part in the driving part 121. Therefore, when the basket 12 rotates, the centrifugal force can minimally act on the pressure gauge 16 to minimally reduce an error between the pressure measured by the pressure gauge 16 and an actual pressure.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A centrifugal dehydrator comprising:
   a slurry flow tube through which a slurry, in which polymers and water are mixed, flows;
   a gas flow tube through which a gas flows;
   a mixture flow tube which is connected from the slurry flow tube and the gas flow tube and through which a mixture of the slurry and the gas flows;
   a basket into which the mixture is injected from the mixture flow tube and which rotates to apply centrifugal force to the slurry in the mixture;
   a driving part that allows the basket to rotate;
   a porous plate disposed on a peripheral portion of the basket to discharge the water from the slurry to the outside of the basket; and
   a pressure gauge configured to measure an internal pressure of the basket,
   wherein a portion of the mixture flow tube extended to an inside of the basket includes a plurality of injection holes which are configured to inject the mixture of the slurry and the gas in one direction to the porous plate,
   wherein the gas is discharged to the outside of the basket through the porous plate, wherein the discharged gas flows to a feedback tube to flow to the gas flow tube,
wherein the feedback tube is connected to an upper portion of a housing surrounding the basket, and
wherein the pressure gauge is disposed on a rotation axis of the basket.

2. The centrifugal dehydrator of claim 1, wherein the gas comprises an inert gas.

3. The centrifugal dehydrator of claim 1, wherein the gas comprise a dry air.

4. The centrifugal dehydrator of claim 1, wherein the gas passes through a dehumidifier before flowing to the gas flow tube.

5. The centrifugal dehydrator of claim 1, wherein the gas flows at a flow rate of 5 L/min to 20 L/min.

* * * * *